(12) United States Patent
Schwartz et al.

(10) Patent No.: US 9,152,609 B2
(45) Date of Patent: *Oct. 6, 2015

(54) VEHICLE STATE DETECTION

(71) Applicants: Roy Schwartz, Mountain Lakes, NJ (US); Zarick Schwartz, Mountain Lakes, NJ (US)

(72) Inventors: Roy Schwartz, Mountain Lakes, NJ (US); Zarick Schwartz, Mountain Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/987,218

(22) Filed: Jul. 12, 2013

(65) Prior Publication Data

US 2013/0338897 A1 Dec. 19, 2013

Related U.S. Application Data

(63) Continuation of application No. 12/703,761, filed on Feb. 10, 2010, now Pat. No. 8,527,140.

(51) Int. Cl.
| | |
|---|---|
| *G08B 1/08* | (2006.01) |
| *G06F 17/00* | (2006.01) |
| *B60R 25/00* | (2013.01) |
| *G07C 5/08* | (2006.01) |

(52) U.S. Cl.
CPC ............... *G06F 17/00* (2013.01); *B60R 25/00* (2013.01); *G07C 5/085* (2013.01)

(58) Field of Classification Search
CPC .......... G07F 17/00; B60R 25/00; G07C 5/085
USPC .......... 701/33.2, 33.3, 500–512; 340/539.13, 340/429
See application file for complete search history.

(56) References Cited

U.S. PATENT DOCUMENTS

| | | | | |
|---|---|---|---|---|
| 7,853,375 | B2 * | 12/2010 | Tuff | 701/32.6 |
| 8,498,610 | B2 * | 7/2013 | Stahlin | 455/404.2 |
| 8,527,140 | B2 * | 9/2013 | Schwartz et al. | 701/33.3 |
| 2005/0255874 | A1 * | 11/2005 | Stewart-Baxter et al. | 455/550.1 |
| 2011/0022263 | A1 * | 1/2011 | Sanchez-Prieto Aler et al. | 701/35 |
| 2011/0084807 | A1 * | 4/2011 | Logan et al. | 340/10.1 |
| 2011/0133919 | A1 * | 6/2011 | Evarts et al. | 340/439 |

* cited by examiner

*Primary Examiner* — Jeremy R Severson

(57) ABSTRACT

This application describes the detection of the state of a vehicle and various actions to be performed based on the detected state. The detection of the state is done by a portable device, carried by the user, which uses onboard sensors to receive operations indicators, and uses rules in a predetermined criteria to determine the operational state of the vehicle. Various methods are described for detecting the states of the vehicle and applications based upon it.

25 Claims, 12 Drawing Sheets

Portable device for taking action based on state of vehicle.

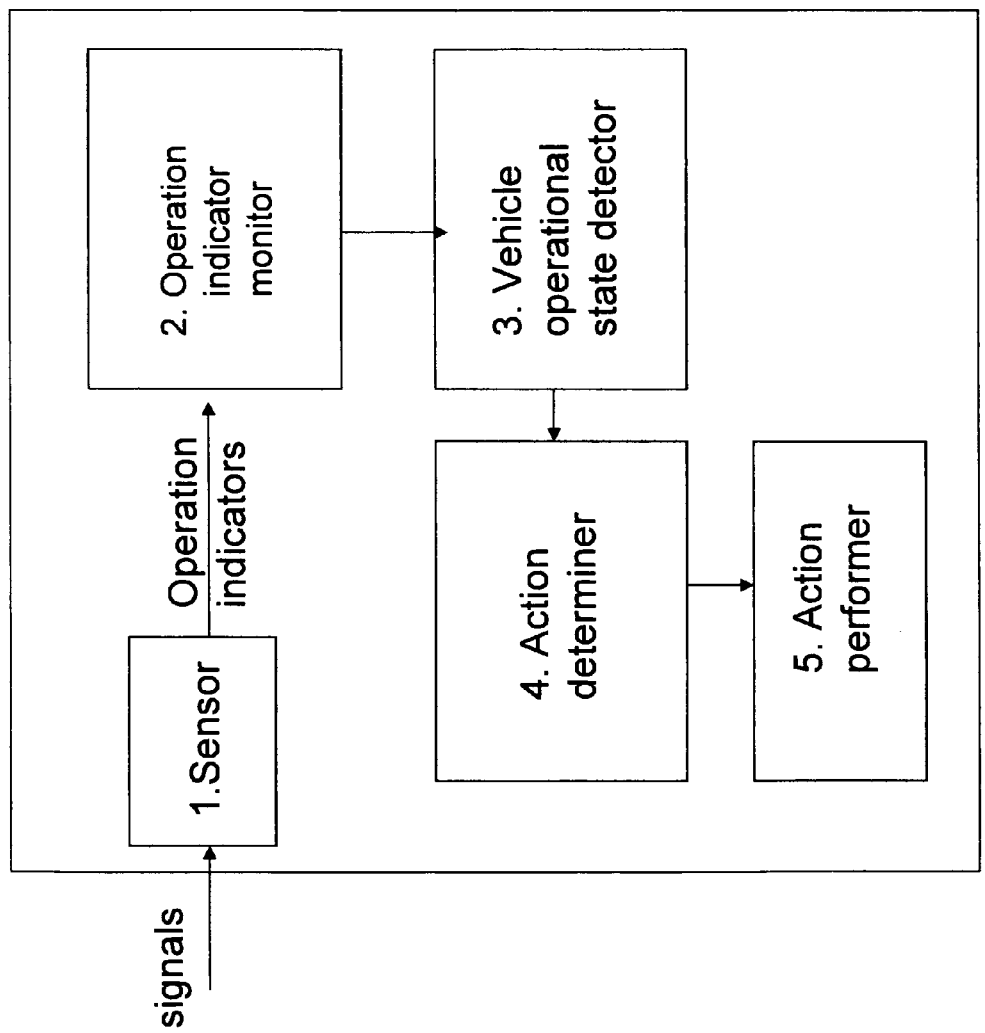
Figure 1: Portable device for taking action based on state of vehicle.

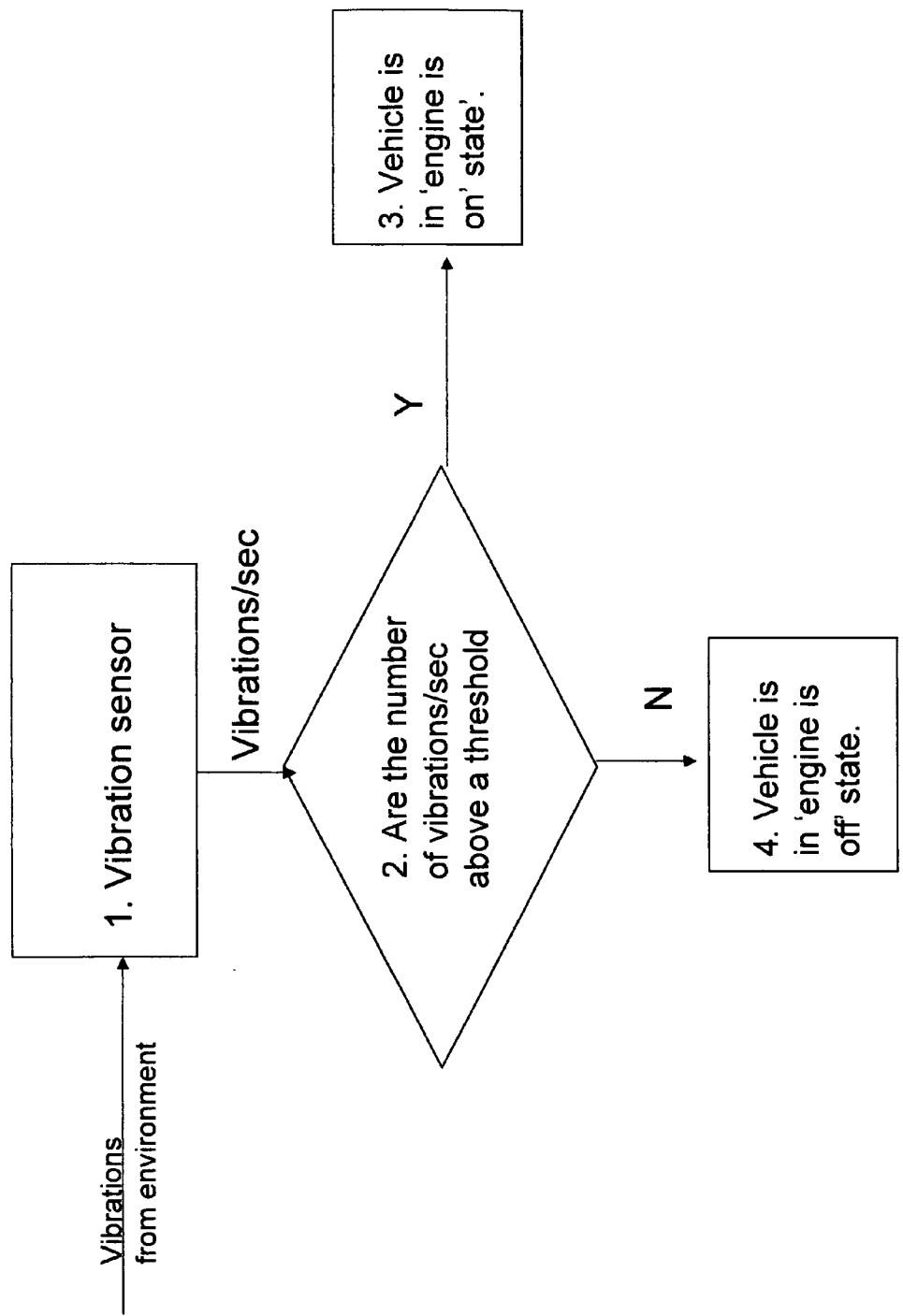
Figure 2: Using vibration sensors to determine if vehicle is in engine on or off state.

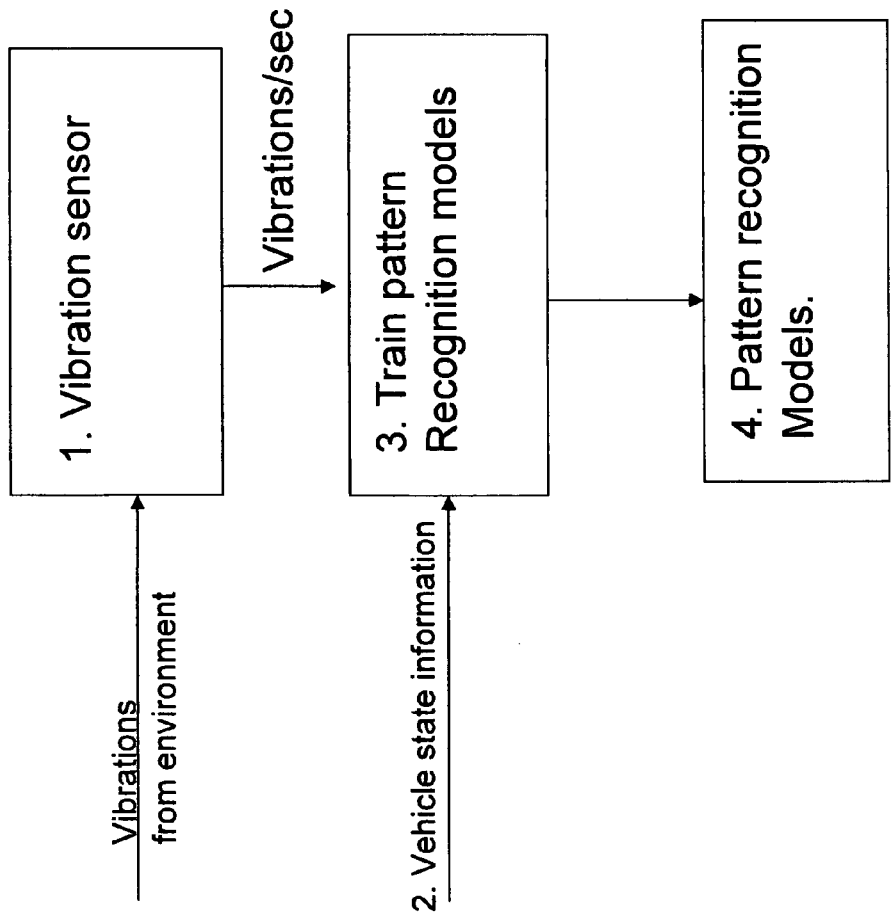
Figure 3: training of pattern recognition models to detect vehicle state.

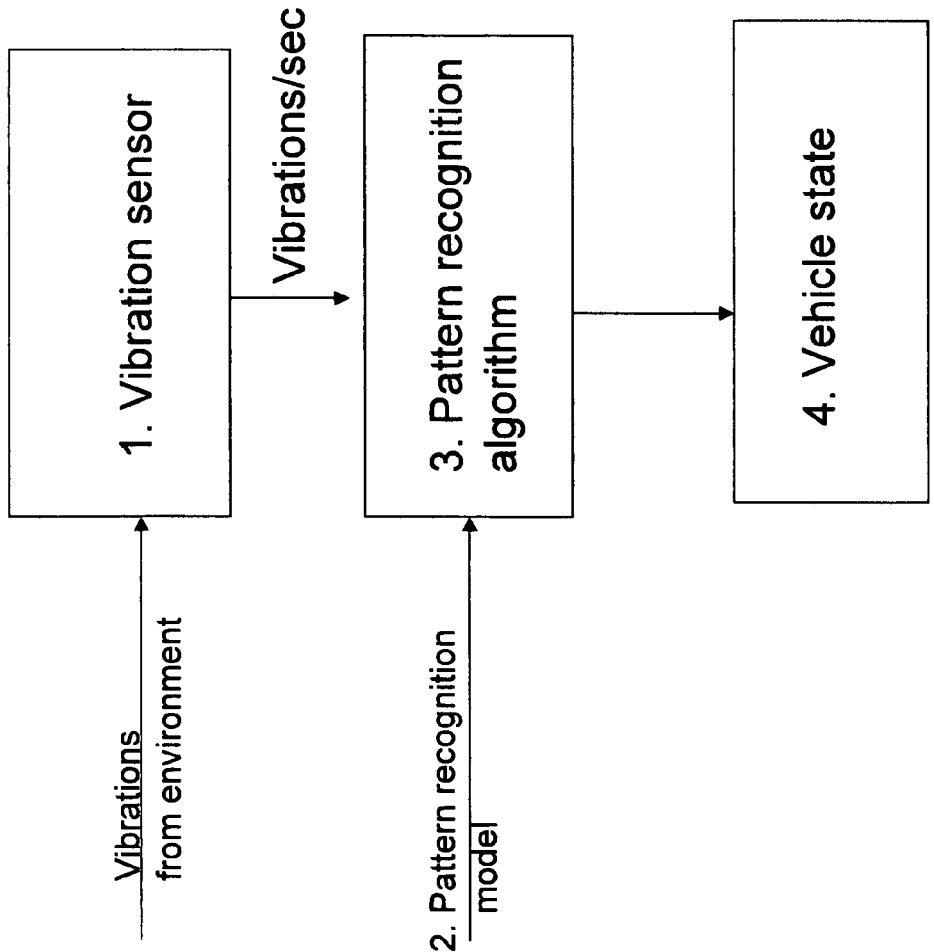
Figure 4: Recognition of vehicle state using pattern recognition models.

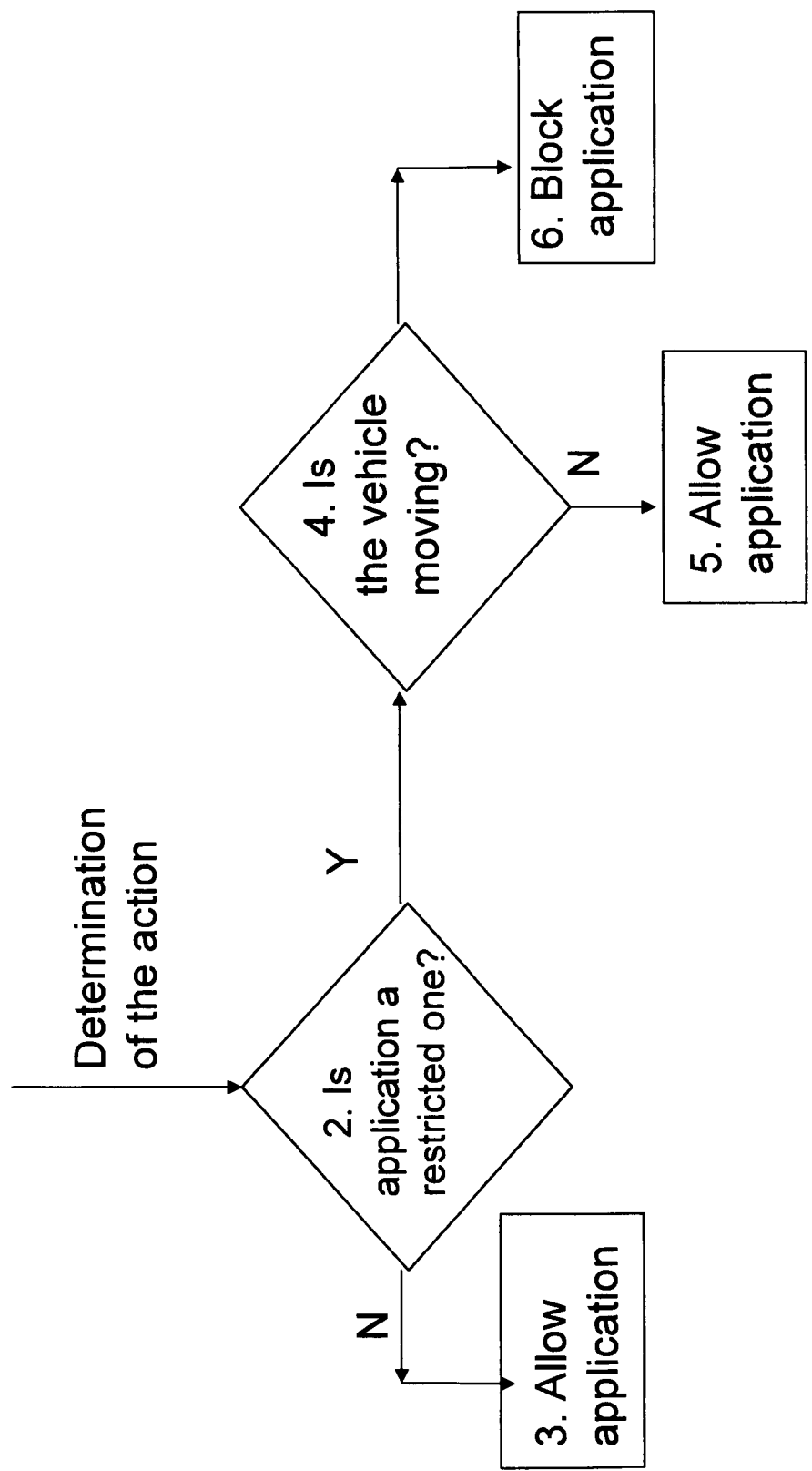
Figure 5: Blocking application based on vehicle state

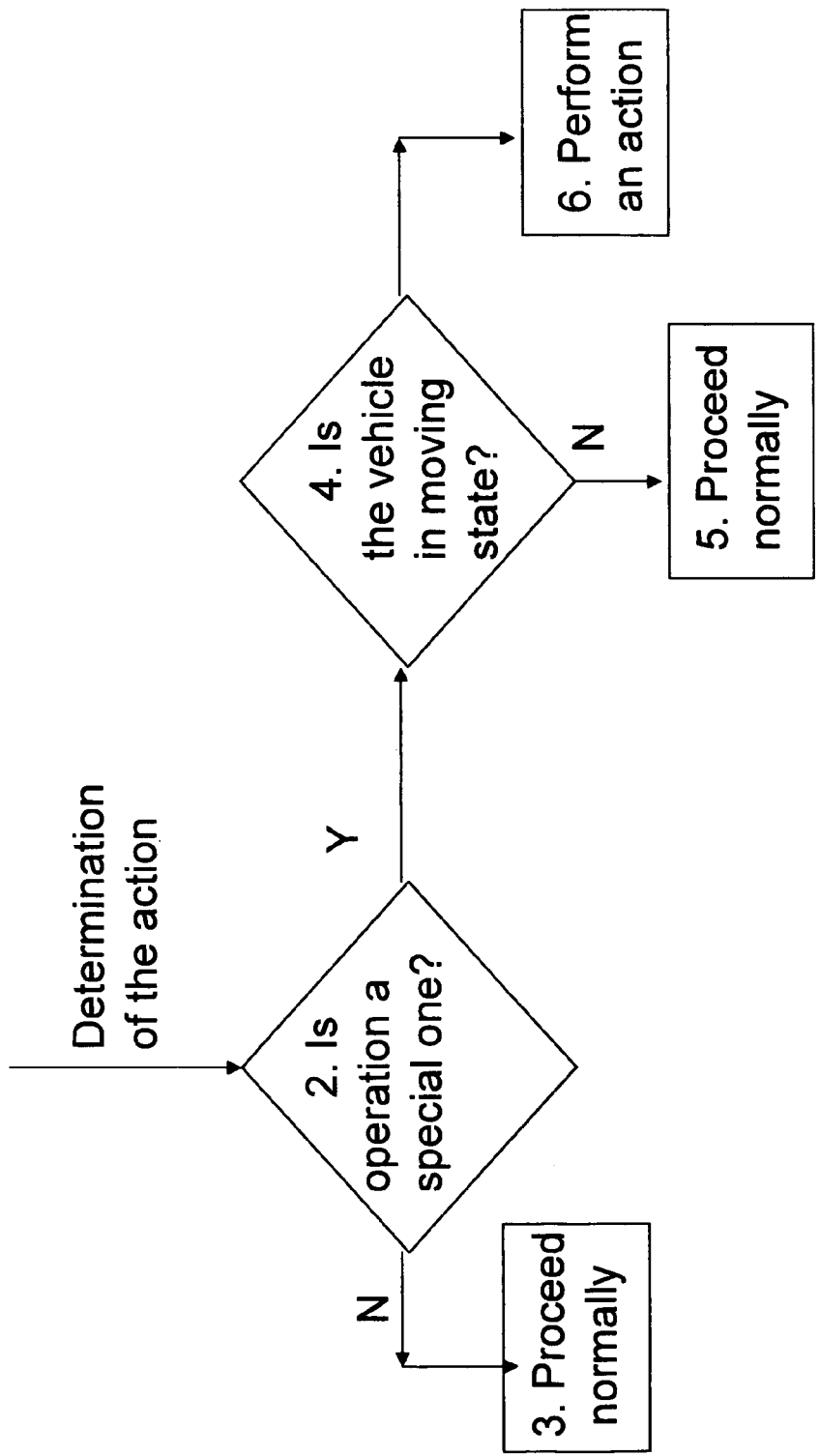
Figure 6: Performing an action based on the vehicle state (one action can be to restrict an operation or an application)

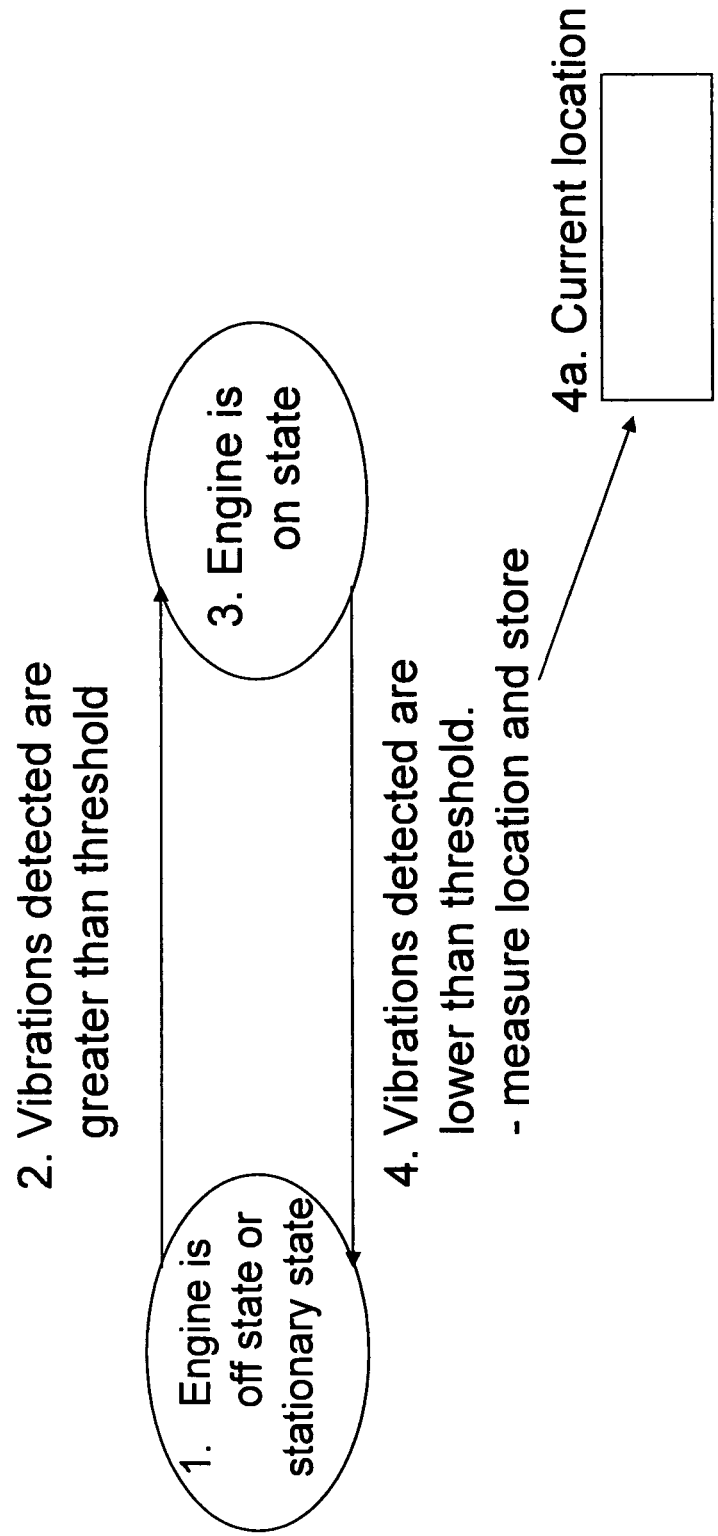
Figure 7: Automatically remembering the parking location of a vehicle.

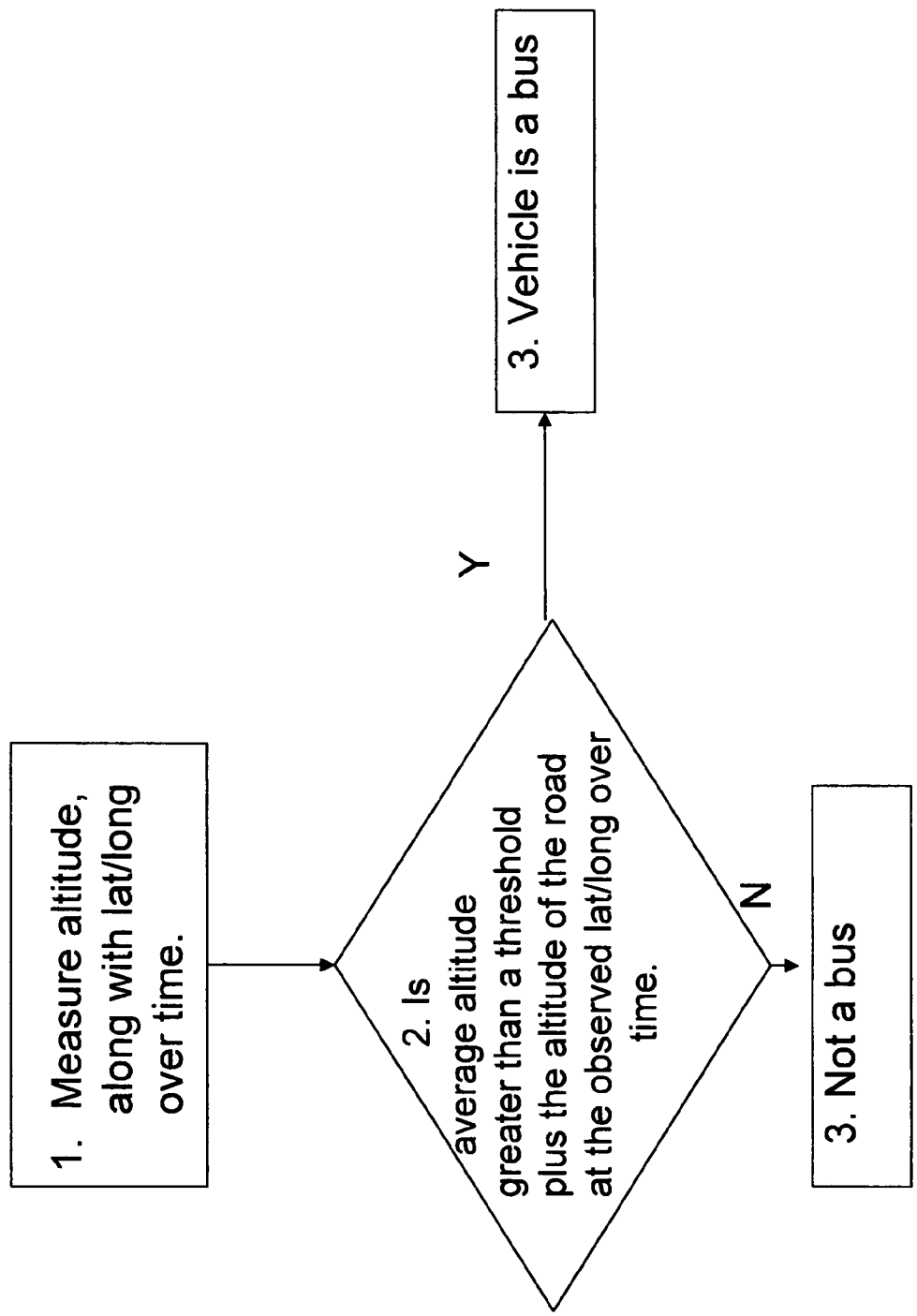
Figure 8: Determine if vehicle is a bus

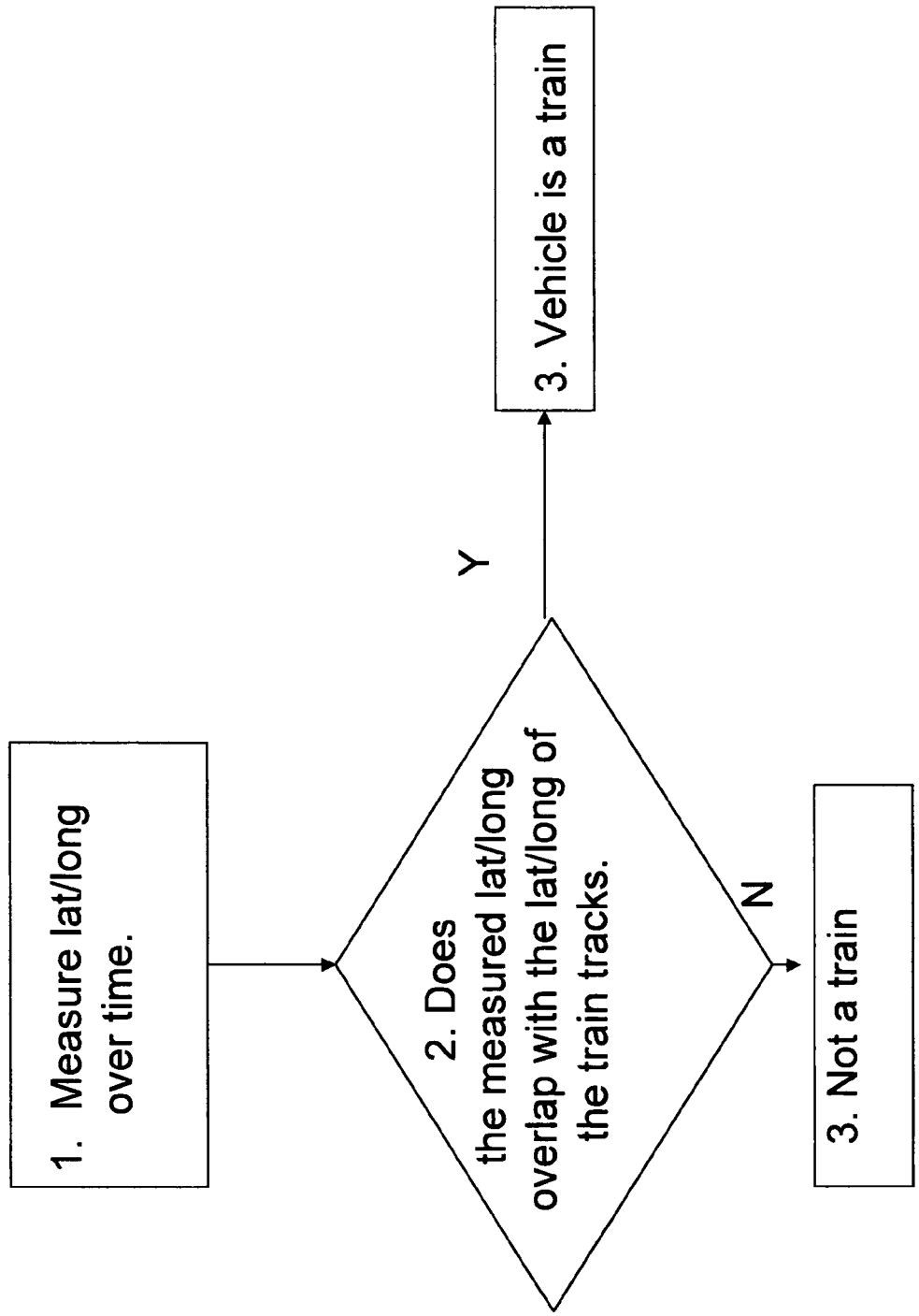
Figure 9: Determine if a vehicle is a train

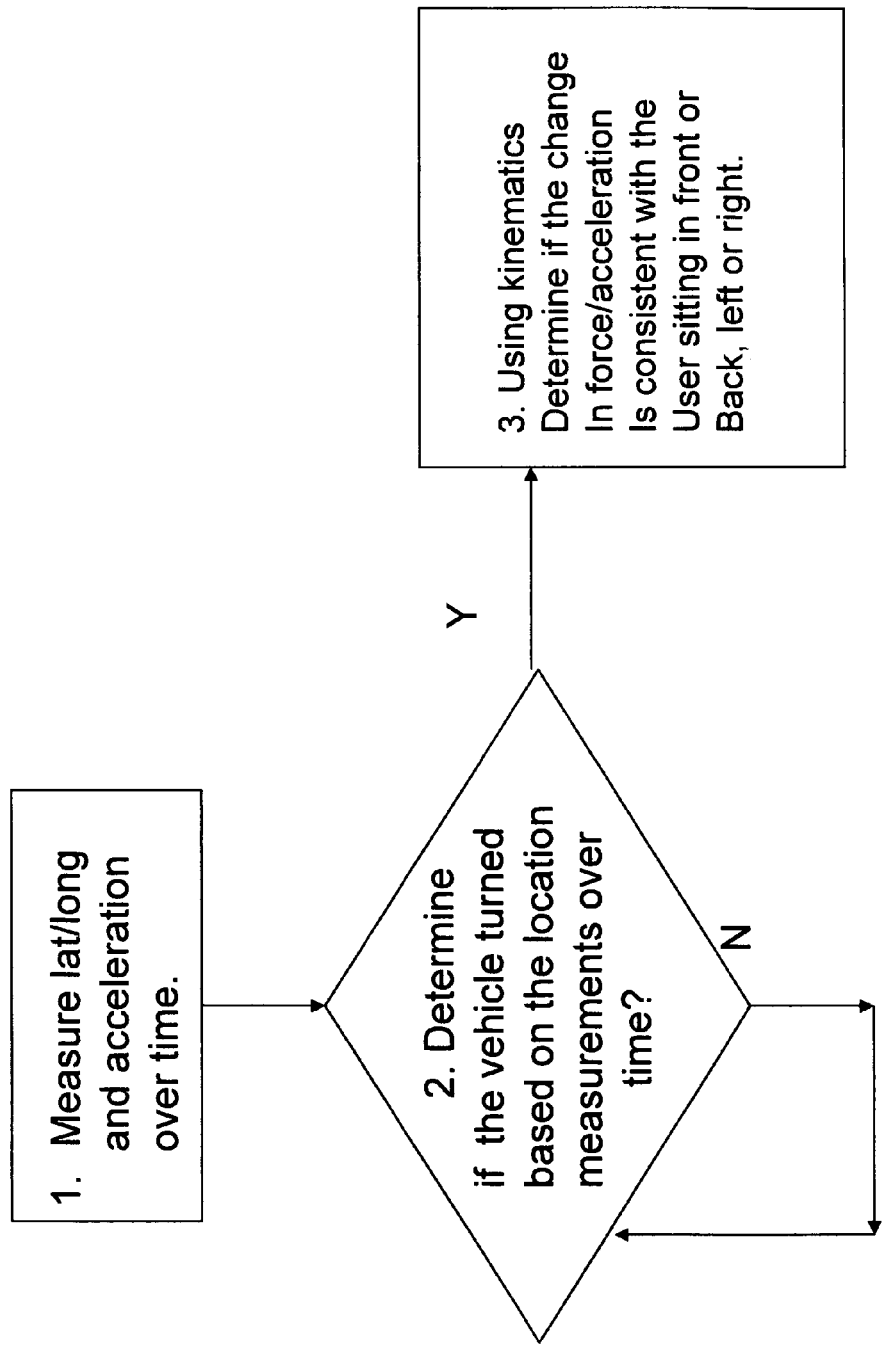
Figure 10: Determine a driver using kinematics

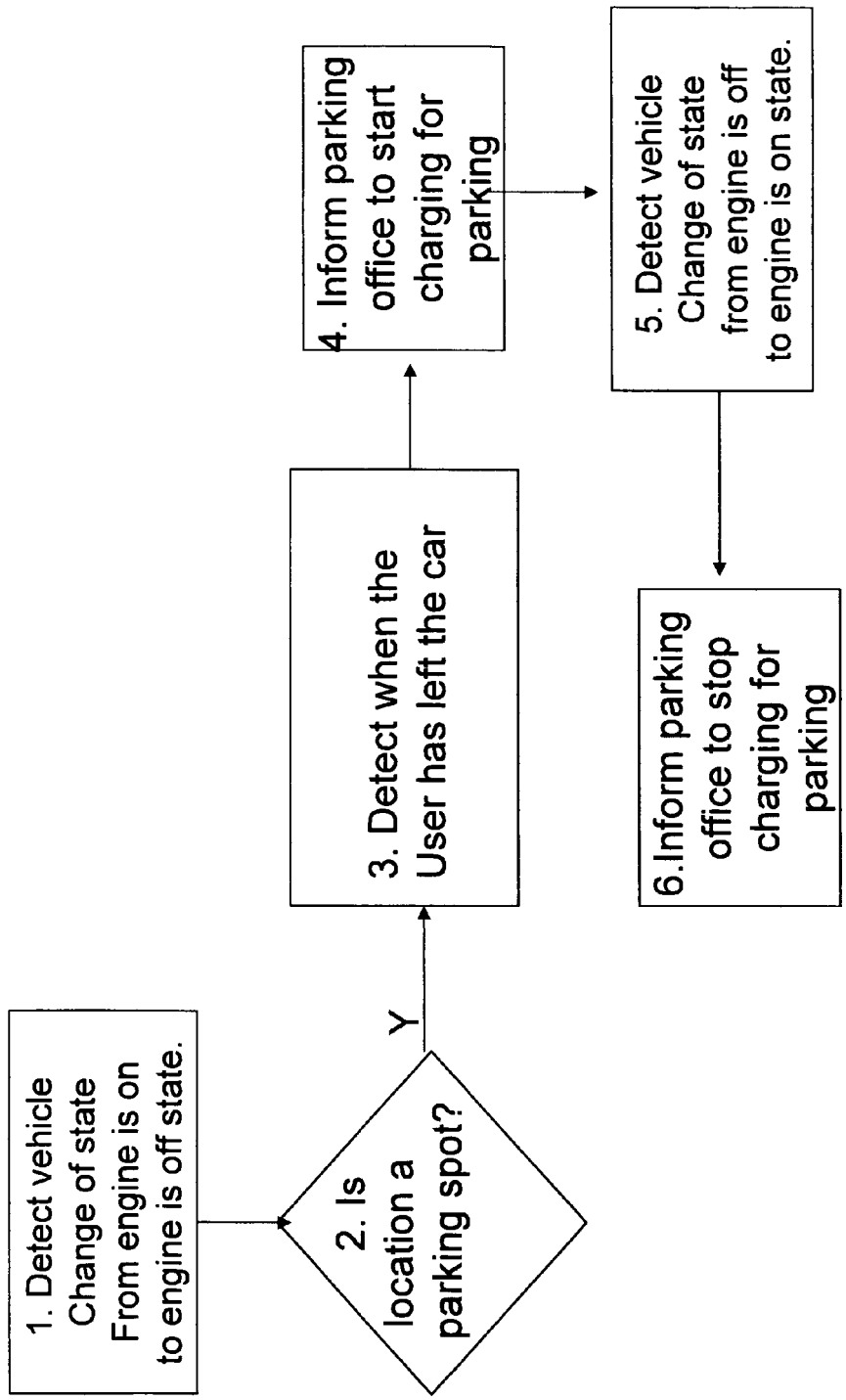
Figure 11: Determine when to charge for metered parking

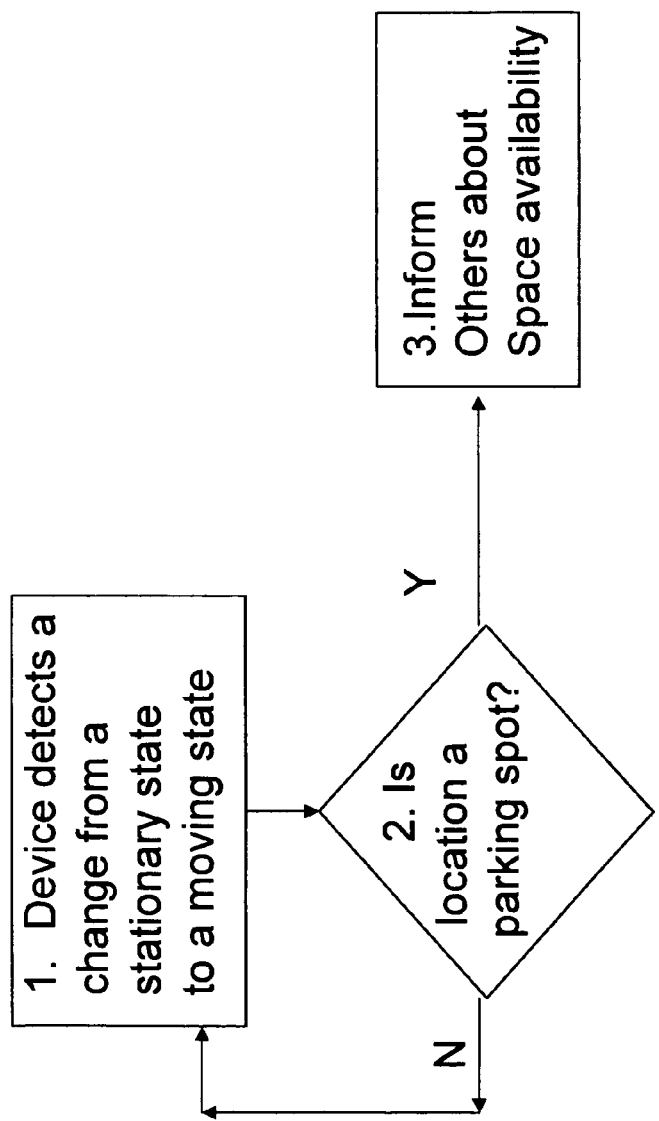
Figure 12. A method for detecting vehicle state to aid in trading parking spaces.

VEHICLE STATE DETECTION

RELATED APPLICATIONS

This application is a continuation of U.S. patent application Ser. No. 12/703,761, entitled "Vehicle State Detection," filed on Feb. 10, 2010, which claims the priority of U.S. provisional application Ser. No. 61/151,508, titled "A method for detecting start and stop of a vehicle," filed on Feb. 10, 2009, all of which are incorporated herein by reference in their entirety for all purposes.

BACKGROUND

1. Field of the Invention

This invention relates to the detection of the state of a vehicle by a portable device carried by a user and the various actions taken upon the detection of the state.

2. Description of Related Art

People often forget where they park their cars at shopping centers, movie theaters, airports and parking lots in general. It would be very useful to have a portable device that automatically remembers where the car is parked and can tell the user, upon request, where the car is parked and also provide directions to the parked car.

Prior art has discussed using key fobs (U.S. Pat. No. 6,694,258, 6,392,592) in the car to know when the car has stopped, but this can only work with new cars who in the future may have this system. Furthermore, the user interface to provide guidance back to the car is very limited. Thirdly, copies of keys will not have the location detection system.

Yet other alternative includes getting signal from the car to provide the notice that the car has stopped and also may be the location information (U.S. Pat. No. 6,392,592). Some signals include wireless signals, change in current, opening of the door, etc for example (U.S. Pat. No. 6,650,999).

All of these have the problem of requiring a tight coupling with the car, such that the system installation is cumbersome. Furthermore, if the user drives a car which does not have the same system pre-installed (e.g. rented car), the user cannot use the system.

Also it is not possible to directly use GPS in the above application to detect whether a car is parked or moving because GPS velocity detection cannot be directly used to distinguish between a user walking slowly and a vehicle being driven slowly. Furthermore, the GPS signal may not always be available.

Another related problem deals with blocking certain actions by a user if the user is moving or speeding, for example, blocking texting on cell phones while the user is moving in a car. Using GPS once again has the disadvantage that it cannot be used to detect when a user is walking or a vehicle is being driven slowly. Furthermore, the GPS signal may not always be available. And taking repeated GPS measurements is expensive in terms of battery consumption, and for this application, very frequently repeated measurements would have to be taken in order to timely block certain actions. The battery drain would make GPS essentially useless for this application. These disadvantages of GPS make it unusable in detecting a vehicle's operational state for the various applications described here.

Another related application is the payment of metered parking. The current state of the art requires the user to park the car and walk to a meter and pay the meter; some systems, in addition, require the user to receive a receipt and display the receipt on the dashboard. This manual payment of metered parking is too cumbersome for the user. There have been systems tried in some areas that allow users to pay by phone, however, even these are based on a manual process, in that they require the user to remember to place the calls, enter meter numbers and, in some systems, remember to call again when the vehicle leaves the parking spot.

Another related application is trading parking spaces where members of a group who have parked at a parking spot, inform the other members when they are about to leave their spot, so that other members get a chance to park at the spot. However, this application still requires manual intervention where the user has to use his cellphone to inform the other members.

SUMMARY

We propose a novel method of detecting the stopping and starting of a car using an accelerometer in a portable device. Vehicles that use the combustion engine always have the engines running at a minimum rotation speed. That is even if the car is not moving, but idling, the engine is rotating at around 800 rpm or around 13 cycles/second. However, if a person is outside the car or if the engine has stopped (i.e the car is parked) the human generated vibrations (e.g. due to walking, shaking, etc) are much less frequent and much less persistent.

We can use these different characteristics of the two states to automatically detect which state we are in and then use a GPS or other location measurement system to measure the location of the stopped car. The two states are 1) 'engine is on' and 2) 'engine is off'. The first state is when the user is sitting in a car with the engine on and the car is either moving or stationary whereas the second state is when the user is outside the car or is in the car but the engine is off. The solution proposed here does not have the above mentioned drawbacks in requiring complex installation, or tightly coupling of the detection method to the vehicle, or a need for GPS to identify the operational state of the vehicle.

We propose the use of accelerometer to detect the differences in vibrations. The accelerometer can also be used to measure accelerations to help determine the operational state of the vehicle. A variation on the invention can also be used to detect the operation state of an electric vehicle by using sensors like accelerometer and using pattern recognition to recognize the different states.

In another embodiment, the portable device using onboard sensors detects that the car is moving or moving at a certain speed which triggers certain actions, for example, blocking certain actions on the part of the user or notifying a third party.

For example, if a truck speeds over a certain predefined speed then a central truck operation center may be notified of the speed. This may help truck companies manage their exposure to traffic tickets and increase the safety of their drivers without compromising the privacy of their location information. This can be done using vibration sensors, like accelerometer, coupled with thresholding or using pattern recognition models to recognize the vehicle state. Speed can also be detected using accelerometer to integrate acceleration over time. Also texting can be disabled when the vehicle is detected to be in a moving state.

Another use is for certain applications to be automatically turned on or off or adjusted based on the operational state of the vehicle. For example a music player on the portable device can adjust its volume based on whether the car is moving at a certain speed or stopped since the noise in a moving car can be greater than in a stopped car.

We have previously mentioned the disadvantages of using GPS to detect the state of the car (i.e. it cannot distinguish between walking and driving at slow speeds, lack of GPS availability in places, excessive battery consumption for frequent measurments), however, the accelerometer does not suffer from these drawbacks. The accelerometer used as a vibration detector or an acceleration detector or more generally as a change in force detector can distinguish between the different characteristics of being in a slowly moving car versus walking. Furthermore, the accelerometer is always available and sensing unlike GPS whose signals may not be available in certain areas (e.g. urban canyons). Also, relative to usage of location services such as GPS, very small amounts of battery power is used by an accelerometer We describe parking application that allows a user's portable device to detect when the state of the car is parked in a parking spot and to automatically pay for parking. Also we describe an application that allows for automatically informing group members when a parking spot is available in a parking spot trading scheme.

BRIEF DESCRIPTIONS OF THE DRAWINGS

FIG. 1 illustrates a portable device for taking action based on the state of the associated vehicle.

FIG. 2 illustrates using vibration sensors to determine if a vehicle is in an 'engine is on' or 'engine is off' state.

FIG. 3 illustrates the training of pattern recognition models to detect vehicle state.

FIG. 4 illustrates the recognition of vehicle state using pattern recognition models.

FIG. 5 illustrates a method of blocking user requested operations based on the state of the vehicle.

FIG. 6 illustrates a method of performing an action based on the state of the vehicle.

FIG. 7 illustrates a method for automatically remembering the location of a parked car and finding the car later.

FIG. 8 illustrates a method of determining if the vehicle is a bus or a car.

FIG. 9 illustrates a method for determining if the vehicle is a train or not.

FIG. 10 illustrates a method for determining if the user is a driver in the car using kinematics.

FIG. 11 illustrates a method for determining when to charge for metered parking.

FIG. 12 illustrates a method for detecting vehicle state to aid in trading parking spaces.

DETAILED DESCRIPTION OF THE INVENTION

Apparatus

FIG. 1 illustrates the portable device apparatus carried by an individual to determine if certain actions should be performed. The decision to perform an action is based on determining the operational state of a vehicle surrounding the portable device. This determination of the operational state of the vehicle is based upon an onboard sensor on the device receiving signals from the environment and converting them to operation indicators, for example, a vibration sensor may measure forces over time (i.e. the signals) and convert them into number of vibrations measured per second (operation indicators). and using rules set in a predetermined criteria to decide upon the state. An example of a vibrational sensing device is an accelerometer.

In unit 1, an onboard sensor receives signals from the environment and converts them into operation indicators. Examples of signals from the environment include vibrations, acceleration, change in forces, noise, etc. Note that sensors do not receive and are not responsible to receive data from a central place, for example weather information, traffic information or location information (e.g. via GPS). There are data receiving units which do receive such data generated from a central place but they do not generate operation indicators. The data receiving device may or may not be part of the portable device, however, we require that a sensor that converts sensory signals to operation indicators be part of the portable device.

The operation indicators, generated in unit 1, are forwarded to the operation indicator monitor unit (unit 2) which continuously monitors and collects the operation indicators over time from at least one sensor. The operation indicator monitor unit may periodically forward the operation indicators to unit 3, the operational state detector unit. This unit uses pre-determined criteria which are a set of rules to help determine the operational state of the vehicle. The rule can be as simple as a threshold or can be more complex involving pattern recognition models where the models are created based on some training data and then are used in real-time for pattern recognition and identification if the rules are satisfied.

We always associate an operational state of the vehicle with the portable device carried by the user. Example of states when the user and portable device are in a vehicle include 'engine is on' state, 'engine is off' state, the vehicle is moving state, and vehicle is stationary state, etc. If the user is not inside any vehicle then we call the state of the associated vehicle as a stationary state even though at this moment the user is not inside a vehicle. We could have called this as a 'no car' state or empty state, however, lumping it with a stationary state helps with the description and exposition of the various applications. This has some intuitive support, in that if the user is not in the vehicle then there is no vehicle motion and the operational state can be considered as stationary. There can be other states of the associated vehicle beyond the ones listed above.

The operational state determined by unit 3 are sent to unit 4 which decides what actions should be taken based on current and past operational states, and may be including other factors. The actions may have been fixed or configured by the users or a third party. Once the actions are decided upon then unit 5 performs the actions.

The apparatus may be a dedicated device or it may run as a software on a general purpose device, for example, the cellphone, pda, or smartphone.

Using Thresholding to Determine State

FIG. 2 illustrates how thresholding of vibration measurements can be used to determine the operational state of the vehicle. The same approach can be used to identify acceleration and speed related thresholds.

The device can wake up, for example, every 30 seconds and take a measurement for 2 seconds, for example, and decide on the state of the vehicle. Inside a vehicle with engine on, the device would see around 26 vibrational events (cycling through a peak and valley) if the combustion engine is on and running at 800 RPM in the 2 seconds whereas outside the car or inside a vehicle with engine is off, the number of vibrations are much less since they are primarily due to the user moving or walking.

In step 1, the onboard vibration sensor on the individual's portable device receives vibrations from the environment. In step 2, the device decides if the total vibrations in the 2 seconds number more than a set threshold (e.g. 15 per 2 seconds). If so then, in step 3, the state of the associated vehicle is declared to be in the engine is on state. If it is less than the threshold then, in step 4, the associated vehicle is declared to be in the 'engine is off' state. The above only illustrates simply how vibrations and simple thresholding can be used to determine the associated vehicles state, however, various variations are possible to adjunct parameters and information like the strength of the vibrations, averaging or filtering techniques to suppress noise.

Using Pattern Recognition

Instead of rule based decision algorithms (e.g. thresholding above) or in addition, we can use pattern recognition techniques like hidden markov models and neural networks to help determine the state of the vehicle. These techniques are used in various different fields including speech recognition, face recognition and handwriting recognition.

In speech recognition, the speech signal is sampled, digitized and features are extracted. Thus over period, e.g. every 10 msec, a feature vector is presented. In the first phase training data is collected and labeled and presented to the training algorithm to create models for words. So various utterances of the word "Yes" are collected and labeled and presented to the training algorithm to create a hidden markov model for the word "Yes". Similarly, utterances for "No" are used to create a model for the word. Furthermore, a background model may be trained for background noise or other words.

Then in the second phase, the hidden markov models created in phase 1 are used by a recognition algorithm to determine if presented speech which has been featurized is the word "Yes", "No", or background noise. Instead of hidden markov models, other pattern recognition techniques are also used, including neural networks.

We can use similar techniques to determine the state of the vehicle. FIG. 3 illustrates how a pattern recognition model can be trained for the purposes of recognizing the state of a vehicle. In step 1 vibrations measured with vehicle's engine on and running are presented as a series in time (e.g. every second) along with the "engine is on" state label applied to it in step 2. These are presented to the pattern recognition model training algorithm which trains the models in step 3 and outputs the trained model in step 4. Similarly, vibration measurements are taken when the vehicles engine is not on or the portable device is not in a vehicle (e.g. individual is walking with the device). This is labeled as "vehicle is stationary" state and "engine is off" state and presented to the training algorithm to train the "engine is off" model which is also output in step 4.

FIG. 4 illustrates how the operation state of the vehicle is detected using pattern recognition. In step 3 the pattern recognition model is running on the portable device and is fed the trained recognition model for each state to be detected in step 2. Also in step 1 the onboard sensor of the portable device is taking vibration measurements and presenting it to the recognition algorithm as a time series. The pattern recognition algorithm outputs the recognized state in step 4.

Although we have described the rule based and pattern recognition methods of vehicle state determination using vibrations, other signals and onboard sensors can easily be substituted, also with any adjunct data or information stored or received. We could use acceleration time series, as measured by an accelerometer, to determine if the car is in a stationary state or in a moving state. More generally we could measure forces acting on the device to determine if the car is moving or stationary.

The reason we are able to train and differentiate using pattern recognition techniques is that human's walking (with a portable device) have a different characteristics with respect to velocity and accelerations patterns when compared to movements of vehicles. For example humans typically walk couple of miles per hour whereas car speeds, if moving, are typically much greater. This can be used to determine if the car has parked. Furthermore, the person sits at certain height in the car, but walks at a different height when walking outside the car. This can be also used to determine when the user transitions from walking to a parked car and from a parked car to walking. The accelerations in the z axis may be greater while walking than when sitting passively in a car.

Also the determination that the user is outside the vehicle (i.e. stationary state) may be delayed until the pattern recognition engine has enough operation indicator samples to make a decision; that is during this time state of the vehicle is in an undiscovered state. During this time, repeated location measurements can be used to help determine the location of the vehicle where the user got off the car. Eventually, when the pattern recognition discovers the state changed at some earlier time to the stationary state then the earlier recorded locations can be used to pinpoint the location of the state change. Later on, the entire location path taken by the user can be presented to the user if so requested.

The use of acceleration as a sensor and pattern recognition with delayed vehicle state determination with recording of various location in the recent path travelled is especially useful in two cases. First, an electric car would not be generating similar vibrations as a vehicle with a combustion engine. In these case acceleration with pattern recognition would be necessary. Secondly, even a vehicle with a combustion engine may linger slowly before stopping completely and it may be difficult to determine early on when the vehicle stopped. This determination may be delayed. Hence, recording location as the car lingers will allows us to pinpoint later on which exact location the car changed to a stationary state and enabling user to locate the position of the car automatically. And even if we cannot pinpoint the exact location point, we can record all the locations points traversed in the recent path starting with the point from which we are sure that the user is out side of the vehicle, and perhaps present them on a map, and let the user determine which point to return to or just to guide user through recorded points until he reaches the destination.

Performing Action Based on the Vehicle State

In this embodiment, illustrated in FIG. 6, the request for an operation on the device by the user and the state of the vehicle is used to determine if an action should be performed by the device. The user, carrying the portable device, tries to perform an operation on the device in step 1 of FIG. 6. In step 2, the device checks if the requested operation is a special one. If it is not then the operation is allowed to proceed normally in step 3, else the device checks if the vehicle is moving in step 4, for example using the accelerometer as described previously. If the device determines that the vehicle is not moving then the operation proceeds normally in step 5, otherwise along with the requested operation the device performs additional action or actions in step 6.

Many different actions can be performed by the device including notifying third parties. For example, a truck driver, making a call on a cellphone while speeding, may trigger a notice to the central truck operations center. Another example, is for a parent to be informed if the teenager driving the car is texting. Furthermore, actions to be performed can be defined in a profile, and even by the user. Third parties can also define the actions to perform and can also define the state to be detected. For example, one state that can be defined is: whether on a specified road, if the user is going over a specified speed (e.g. the posted speed limit).

The method of determining a moving state can be based on an accelerometer, as previously described, or other alternatives and can be rule based or based on pattern recognition techniques. For some sensors, the moving or stationary states in this and previous section can be substituted with 'engine is on' and 'engine is off' states.

Another application is for the portable device to automatically and transparently to the user perform some action based on the operational state of the vehicle. For example, upon detection of the vehicle not moving, a portable device that also plays music can lower the volume. Similarly, the portable device can detect the speed of the vehicle and adjust the volume to be more or less since a faster moving vehicle generates greater noise. Another use of this may be to perform certain applications, like receiving traffic information, only when the vehicle is in a moving state or in the 'engine is on' state. This will save on communication resources and battery life compared to always receiving traffic information even though its of no use.

Blocking Operation Based on the Vehicle State:

One of the actions performed above could be to block a requested application. This is illustrated in FIG. 5, where the state of the vehicle is used to determine if an application should be blocked or allowed. This may be useful for a parent wanting to block a teenager from texting while the car is moving.

The user, carrying the portable device, tries to invoke an application on the device in step 1 of FIG. 5. In step 2, the device checks if the requested application is a restricted one. If it is not then the application is allowed to proceed normally in step 3, else the device checks if the vehicle is moving in step 4, for example using the accelerometer as described previously. If the device determines that the vehicle is not moving then the application is allowed in step 5, otherwise the application is blocked in step 6.

The user may be provided a notice that the requested application is being blocked. Alternatively, blocking can happen if the vehicle is in stationary state.

Furthermore, instead of just detecting if the vehicle is moving, the state detected could be more complex, for example, whether the vehicle is moving faster than a specified threshold. The threshold could be defined based on the speed limit or delta from the speed limit, wherein the speed limit is determined based on the location of the vehicle.

Another operational state of the vehicle that is useful to detect is whether the vehicle is stopped at a traffic light. If this state is detected, it may be useful to continue blocking certain user operations, like texting, even though the vehicle is momentarily not moving. In order to detect that the vehicle is stopped at a traffic light, firstly, it is necessary to detect that the vehicle is not moving and then, secondly, using the current location information determine if the vehicle is located close to a traffic light by searching for the closest light in a geographic database that contains location of traffic lights, and deciding if the distance between the vehicle and the nearest light is small enough to be considered as waiting at that light.

Using Change in State Detection to Find a Parked Car

The example method of the portable device that can automatically remember the parked location of the car (see FIG. 7) and aid the user in finding the parked car is as such:

1) user with the portable device is outside the car and the portable device's associated vehicle is in the 'engine is off' state or stationary state (step 1 in FIG. 7 and taking periodic measurement of vibrations that are happening. The device can wake up, for example, every 30 seconds and take a measurement for 2 seconds, for example. Inside a vehicle with engine turned on, the device would see around 26 vibrational events (cycling through a peak and valley) if the engine is running at 800 RPM in the 2 seconds whereas outside the car or inside a stopped car, the number of vibrations are much less.
   a. The device can decide that if the total vibrations in the 2 seconds number more than a set threshold (e.g. 15 per 2 seconds) then the state of the device is changed to the 'engine is on' state. If it is less than the threshold then the device can again sleep for sometime without changing its state.
2) The user sits in the car and starts the engine. The portable device detects (in step 2 FIG. 7) that the number of vibrations are greater than 15 within 2 seconds and changes its state to the 'engine is on' state (step 3 in FIG. 1).
3) The portable device, in 'engine is on' state, continues to periodically measure the number of vibrations to detect if the engine has stopped.
4) Eventually, the user parks the car at a parking lot in a mall. The portable device counts the number of vibrations within 2 seconds and sees that they are much less than the threshold of 15 (step 4 in FIG. 7) when the engine is turned off. The portable device uses its GPS system or other location measurement system to discover the current location of the car and it remembers this location as the location of the parked car (in 4a in FIG. 7). The device now changes its state to the stopped state (this is same as step 1 in FIG. 7).
5) The user walks to the mall, shops and is ready to return to the car, but has forgotten its location. The user asks the portable device to give directions to the car. The portable device recalls the last measured location (4a in FIG. 7) and gives the user directions to the car location using GPS. The direction can be given in many ways including on a lcd screen or by voice prompts.
6) Once the user reaches the car and starts the engine, the portable device detects that the number of vibrations are greater than 15 and changes its state to 'engine is on' state (back to step 2 in FIG. 7).
7) The above steps will be repeated for future travels.

The portable device uses vibration measurements for two purposes, first to detect when the car has parked (by detecting when engine is off) so that a GPS measurement can be taken and also when the car has started (by detecting when engine is on). Without recognizing the transition from an 'engine is off' to a 'engine is on' state, the portable device would not be able to know when to recognize the next parking of the car.

Instead of remembering only one last location, the portable device can remember the last n locations and their time and show them to the user for review or selection for directions to the selected location. Furthermore, other actions can be taken instead of or in addition to remembering the location, for example, informing the network or a third party upon the detection of a state or a change of state.

The portable device for this and other applications can be a standalone device, or it can be combined with some existing device. One choice is to put it in the key fob. Another choice is to combine it with the cellphones. This is particularly attractive since everybody carries a cellphone and the user interface is helpful in providing directions back to a parked car. Also many cellphones (smartphones, pdas) come with GPS and some even come with a builtin accelerometer and compass.

As mentioned earlier, instead of using vibrations to detect the state transition accelerometer can be used to track changes in the velocity by accumulating changes in acceleration.

Determine the Type of the Vehicle

Certain operations may be desirable to be blocked when the vehicle is a car and moving, but may be allowed in a bus even if it is moving. The question is how to detect the vehicle type as to whether the vehicle is a bus, train, car, airplane or ship. By default one can assume the vehicle is a car unless it can be detected and confirmed that it is a different vehicle.

In one embodiment, FIG. 8, illustrates how to determine if the vehicle is a bus and not a car. In step 1, the device takes measurements of altitude and lat/long over time. In step 2, the device checks how high the altitude of the device is when compared to the known altitude at the given lat/long. If the average difference is altitude is greater than a specified threshold then in step 4, the device determines that the vehicle is a bus otherwise, in step 3, it determines that the vehicle is not a bus. This is possible because the height at which passengers sit in a bus is much higher than the height in a car. Similarly, altitude can be used to determine if the user is flying in a plane.

Some vehicles (e.g. trucks) may have similar height as buses, and it may not be directly distinguishable as to whether a bus or a truck is the vehicle. Based on the application and the context, this may not be an issue. If the goal is to determine if the truck or the bus is being driven by the user then later methods can help with this goal.

In another embodiment, FIG. 9, illustrates how to determine if the vehicle is a train or not. In step 1, the device takes measurements of latitude/longitude over time. In step 2, the device checks whether the observed location points over time, corresponds to known railway tracks. If they do correspond then the device determines that the vehicle is a train in step 4, otherwise it determines that it is not a train in step 3. Similarly, the location data can be used to determine if the user is in a ship by checking the correspondence of the user's travel with known bodies of water.

Driver Determination Using Kinematics

Sometime we may want to block a requested operation or perform an action depending upon whether the user is the driver or not. In one embodiment, illustrated in FIG. 10, such a method is described. In step 1, the device takes location and acceleration measurements over time. In step 2, the device determines the times at which the vehicle has turned based on the changes in location points recorded over time. If no turn is detected so far then the device keeps checking till a turn is observed, at which point, in step 3, the device uses kinematics to determine if the changes in forces/acceleration is consistent with the user sitting in the front or back. Similarly, different forces act on the driver side and passenger side and the recorded acceleration can be used to determine this.

Alternatively, for determining if the user is sitting in the driver seat or the passenger seat, the device can record location data over time and compare with the know location of roads and lanes to determine if the user is sitting close to the left side of the lane (i.e driver side) or to the right side of the lane (i.e. passenger side). The minor differences would not help us readily determine the user's side, however, over time as more data is collected, the confidence level goes up as to the side of the user.

A yet another alternative is to have a location device in the vehicle at a fixed, known location. The user's device can query the vehicle location device for its lat/long value and use it to determine its position in the car. Alternatively, the user's device can talk to other users devices in the car and query for their lat/long. If they respond then the device can determine its relative position in the car. If nobody responds then it is safer to assume that the device belongs the driver, If some other device responded and the user's device, for example, is always to the left and front relative to the other device and the motion of the car then it can be confidently determined that the user is a driver.

Automatic Charging for Metered Parking.

Paying for parking can be difficult with the user required to walk to a meter and either use a credit card or insert coins. A novel, method, illustrated in FIG. 11, is proposed to automate proper payment of parking. The user's portable device monitors when the state of the vehicle changes to 'engine is off' state in step 1. Furthermore, it uses location measurement (e.g. GPS) to discover if the location where the engine was turned off is a parking spot which requires payment in step 2. Next it monitors optionally to see if the user's location has changed to detect if the user has left the car in step 3. This can be done by making location measurements using GPS or other network means. Another way is to use accelerometer to measure changes in acceleration which can be integrated to discover velocity changes which can be further integrated to discover space displacement.

The portable device will signal to the central parking office, in step 4, that the vehicle associated with the portable device has started parking and a pre-registered account should be charged for parking. The device continues to monitor changes to the state of the vehicle and when it detects that the state, in step 5, has changed from 'engine is off' to 'engine is on state then the device will inform the central parking office wirelessly to stop charging for parking in step 6. There is also a possibility to start charging as soon the operational state of vehicle is vehicle is stationary and stop charging as soon as the operational state of the vehicle has changed to vehicle is moving state.

Discovering Available Parking Spots

In another embodiment, FIG. 12, describes how detecting the state of the vehicle can help with efficient parking. Users who use this parking notification application would be running a specialized software on their device or using a web version which will detect, in step 1 in FIG. 12, for a change of state of the vehicle from a stationary state to a moving state. The previously described methods to detect the vehicle states (e.g. using accelerometer) can be used. Once this change of state is detected, the device will check, in step 2, if the stationary location corresponds to a parking space (e.g. a street parking spot where parking is allowed at the current time). If it is a match then the device will inform, in step 3, all the other interested members, either directly or indirectly via a central service, that this parking spot is available. The algorithm could be sophisticated enough to limit number of notifications per available parking spot and restrict notification only for members that are close enough to the parking spot. Other members who are interested in being informed about available space, can specify that they want to see in a list the available spaces within a certain distance (e.g. 500 ft radius) and that were vacated recently (e.g. last 2 minutes). It is important to allow these criteria because you do not want the members seeking open parking space to drive to a location only to have it filled by a non-member. Limiting the time and distance to travel to the open space increases the likelihood of acquiring the space before a non-member does. Other options include showing the parking spots on a map with the elapsed time since they became available. Also one can just list in sorted order the available spaces based on a function of distance and elapsed time; as new spaces become available they can be added to the list. Alternatively, as new spaces become available, the user can be alerted via a notice sent to the device. As more people sign up for service the more efficient the service becomes in pointing users to free spaces more quickly. This results in fewer parking spaces going empty in a time period and thus increasing the utilization of the street parking spaces.

What is claimed is:

1. A method of performing one or more actions on a portable device carried by an individual, comprising:
   monitoring, at least one operation indicator transparently to the individual, wherein the at least one operation indicator is created by an on-board component of the portable device when the portable device is located inside a vehicle;
   detecting the at least one operation indicator that meets one or more predetermined criteria;
   determining one or more operational states of the vehicle based on the one or more predetermined criteria;
   determining at least one action to be performed on the portable device carried by the individual, based at least in part on:
   i) the one or more operational states of the vehicle and
   ii) at least one previous change in the operational state of the vehicle wherein the at least one previous change in the operational state comprises at least one of the following: a change from the vehicle being in a moving state to being a lingering state; a change from the vehicle engine being in an on-state to being in an off-state; a change from the vehicle being in the moving state to being in a stationary state; a change from the vehicle's speed being in a below predetermined speed limit state to being in an above the predetermined speed limit state; a change from the vehicle being in the stationary state to being in the moving state; a change from an engine being in an is off-state to being in an on-state; and a change from the engine being in the is off-state to the vehicle being in the moving state; and
   performing the at least one action on the portable device.

2. The method of claim 1 wherein the portable device is a key fob or cell phone.

3. The method of claim 1 wherein the one or morepredetermined criteria include at least one of the following:
   a) pattern recognition models of the at least one operational indicator wherein the at least one operational indicator is generated at least due to one or more of the following: operation of the vehicle and movement of the portable device caused by the individual;
   b) one or more thresholds of the at least one operational indicator wherein the at least one operational indicator is generated at least due to one or more of the following: the operation of the vehicle and the movement of the portable device caused by the individual.

4. The method of claim 3, wherein the at least one action is: detecting at least one of the following type indicators: at least one location point of the portable device over time and an altitude of the portable device.

5. The method of claim 4, the method further comprises: determining that the individual is a driver of the vehicle based at least in part on acceleration, forces, velocity, the at least one location point, and time.

6. The method of claim 4, wherein the method further comprises:
   determining a type of the vehicle, wherein the type of the vehicle is one of the following:
   a taxi; a bus; a carpool; and a train.

7. The method of claim 6, the method further comprises: determining that the individual is a driver based at least in part on at least one of the following:
   a) the type of the vehicle and
   b) acceleration, forces, velocity, location, and time.

8. The method of claim 7, wherein the at least one sensor is an accelerometer.

9. The method of claim 3, wherein the determining the one or more operational states of the vehicle further comprises indentifying that the individual is a driver of the vehicle.

10. The method of claim 9, wherein the at least one predetermined pattern recognition model comprises:
    at least one markov model generated for an average driver.

11. The method of claim 9, wherein the at least one operation indicator sequence comprises at least one of: acceleration, forces, velocity, location, and time.

12. The method of claim 3, wherein the at least one pattern recognition model comprises:
    at least one markov model.

13. The method of claim 1, wherein the one or more predetermined criteria are based at least on one or more previously determined operational states.

14. The method of claim 1, wherein the determining the one or more actions based on the one or more operational states of the vehicle comprises:
    changing a previously determined operational state based on the one or more predetermined criteria.

15. The method of claim 1, wherein the determining the one or more operational states of the vehicle further comprises determining a type of the vehicle wherein the type of the vehicle is at least one of the following a train and a bus.

16. The method of claim 1 wherein the performing the at least one action when the at least one operational state indicates that the vehicle is in the moving state further comprises one of the following:
    a. disabling usage of the portable device when the at least the one operational state indicates the vehicle is in the moving state and the individual operates the portable device;
    b. disabling entering text when the at least the one operational state indicates the vehicle is in the moving state and the individual operates the portable device;
    c. disabling making voice calls when the at least the one operational state indicates the vehicle is in the moving state and the individual operates the portable device;
    d. making a connection with another phone when the at least the one operational state indicates the vehicle is in the moving state and the individual operates the portable device;
    e. making a connection to the known interne address and sending information on the one or more determined operational states.

17. The method of claim 1, wherein the determining the one or more operational states of the vehicle further comprises:
    determining a position of the portable device; and
    determining the one or more operational states of the vehicle based on the one or more predetermined criteria and the position of the portable device.

18. The method of claim 17, wherein the determining of the position of the portable device comprises: determining the position of the portable device in relation to a driver's seat of the vehicle.

19. The method of claim 18, wherein the determining the position of the portable device in relation to a driver's seat of the vehicle comprises: determining that the vehicle is in a moving state and the individual is a driver of the vehicle.

20. The method of claim 1, wherein the method further comprises:
    determining that the vehicle is in the moving state and the individual is a driver of the vehicle, wherein the determining is based at least in part on: 1) the one or more operational states of the vehicle, identifying that the vehicle turns a corner, and 2) the one or more predetermined criteria.

21. The method of claim 1 wherein at least one operation state of the one or more operational states of the vehicle matches at least in part characteristics associated with at least one of the following conditions:
the vehicle is moving;
the vehicle's movement is lingering;
the vehicle's speed is below the predetermined speed limit;
the vehicle's speed is above the predetermined speed limit;
the vehicle's acceleration direction and level;
the vehicle turns a corner;
the vehicle is not moving;
the vehicle is stationary;
the individual is inside the vehicle;
the individual is outside the vehicle;
the vehicle's engine is off; and
the vehicle's engine is on.

22. The method of claim 1 wherein the at least one operation indicator comprises at least one of:
i) a measurement of at least one force acting on the vehicle measured at predetermined sampling periods,
ii) a measurement of vibration of the vehicle;
iii) a measurement of at least one kinematic quantity of rotation measured at predetermined sampling periods,
iv) a measurement of at least one acceleration of the portable device measured at predetermined sampling periods in one or more directions,
v) a representation of at least one noise indicator generated by the moving vehicle at predetermined sampling periods, and
vi) a representation of at least one wireless signal associated with the vehicle.

23. The method of claim 1 wherein the at least one operation indicator is created by an accelerometer located on the portable device.

24. The method of claim 1 wherein the one or more predetermined criteria comprise at least one of:
i) the at least one operation indicator matches at least one pattern recognition model, indicating that the vehicle is moving;
ii) the at least one operation indicator matches at least one pattern recognition model, indicating that the vehicle movement is lingering;
iii) the at least one operation indicator matches a vibration threshold, indicating the engine is off;
iv) the at least one operation indicator matches a vibration threshold, indicating the engine is on;
vi) the at least one operation indicator matches one or more thresholds, indicating the vehicle is moving;
vii) the at least one operation indicator matches one or more thresholds, indicating the vehicle is stationary;
viii) the at least one operation indicator matches at least one pattern recognition model that is associated with a driver of the vehicle; and
ix) the at least one operation indicator matches at least one pattern recognition model that is associated with the individual that is walking.

25. An apparatus for monitoring a vehicle, the apparatus comprising:
at least one sensor generating at least one operation indicator;
at least one operation indicator monitor configured to monitor one or more operation indicators;
at least one vehicle operation state detector configured to:
a) detect when the one or more operation indicators meet one or more predetermined criteria, wherein the one or more predetermined criteria correspond to characteristics identifying at least one operational state of the vehicle,
b) select the one or more predetermined criteria that the one or more operation indicators meet, and
c) assign the at least one operational state of the vehicle upon selection of the at least one predetermined criteria;
at least one action determiner operable to select one or more actions based on the at least one operational state of the vehicle; and
action performer operable to perform one or more actions based on the at least one operational state of the vehicle; whereby the one or more operating indicators are generated without any connection to other apparatuses in the vehicle and outside the vehicle.

* * * * *